United States Patent Office.

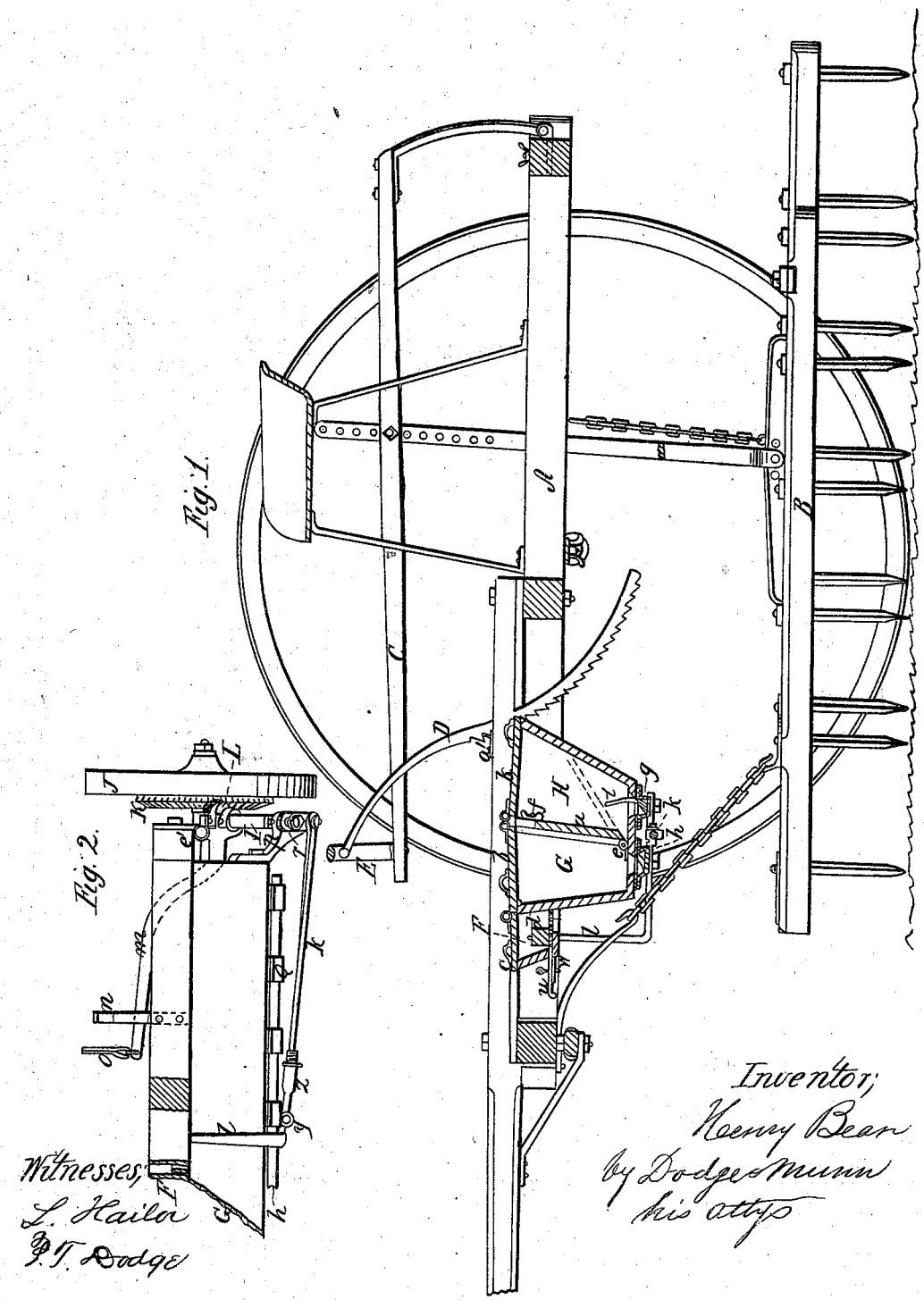

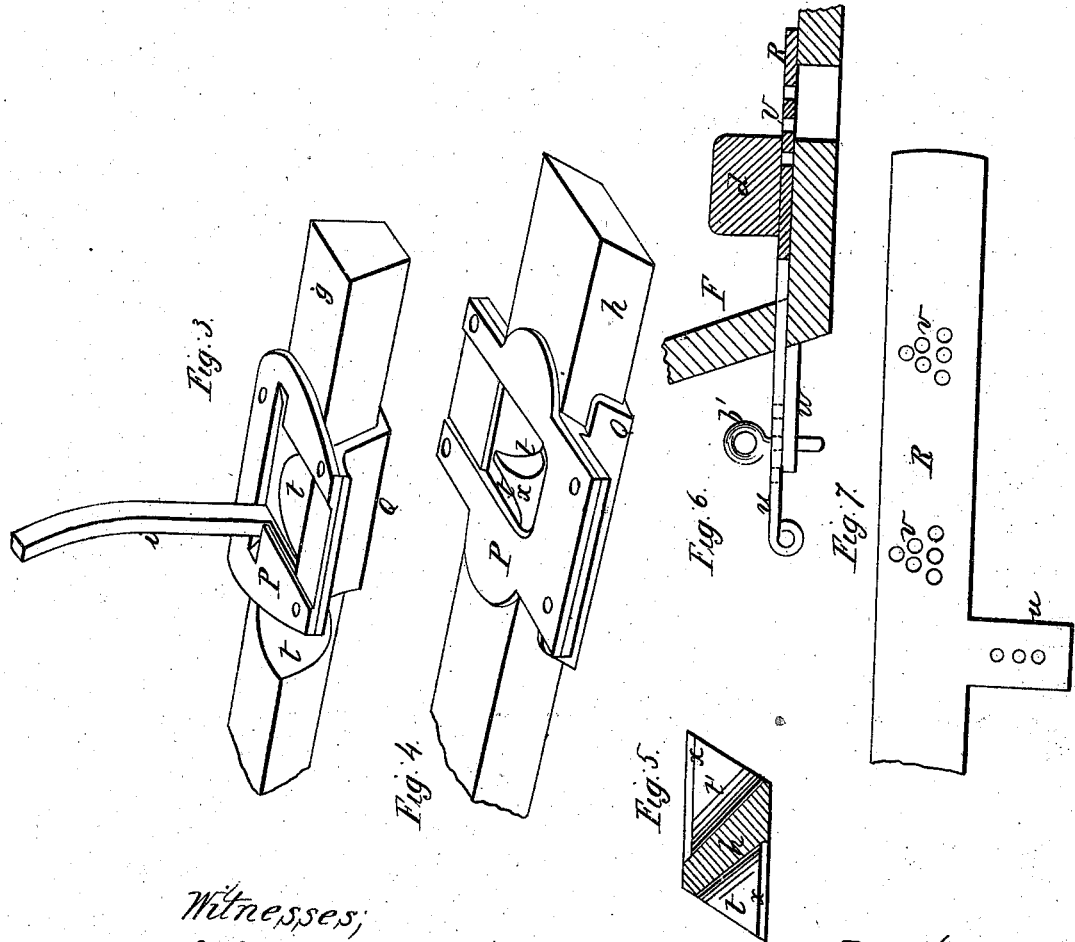

HENRY BEAN, OF SCHUYLKILL, PENNSYLVANIA.

Letters Patent No. 89,728, dated May 4, 1869.

IMPROVEMENT IN SEEDING-MACHINE.

The Schedule referred to in these Letters Patent and making part of the same.

*To all whom it may concern:*

Be it known that I, HENRY BEAN, of Schuylkill, in the county of Chester, and State of Pennsylvania, have invented certain new and useful Improvements in Seeding-Machines; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention consists in certain improvements in machines used for sowing grain, grass-seed, and fertilizers, all combined, or separately, as desired, the special features of my improvements being hereinafter described.

Figure 1 is a longitudinal vertical section;
Figure 2, a front view of a portion; and
Figures 3, 4, 5, 6, and 7, are views of portions detached, and represented more in detail.

In constructing my improved machine, I make a frame, A, of any suitable form, but, preferably, as described in the patent issued to me, October 15, 1867, and secure under it a harrow, B, for covering the grain, as therein described.

At the front part, under the main frame, I secure a triple hopper, F G H, for holding the materials to be sown, the arrangement of these hoppers being shown in fig. 1, the front one, F, being for grass-seed, the second one, G, for grain, and the rear one, H, for phosphates, or other fertilizers.

In each of these hoppers is placed a slide, for distributing, or feeding out the grain; which slides are all operated by a bevel-gear wheel, K, attached to one of the bearing-wheels, J, as shown in fig. 2.

This wheel K gears into a corresponding pinion, L, on the end of a shaft, I, which extends from the wheel to the front end of the machine, and which shaft has, on its front end, an adjustable crank, r, which is connected to a pitman, k, the opposite end of which is screwed into a sleeve, z, pivoted at y to a cross-bar, l, which is rigidly connected to all three of the slides, by bolts, in such a manner that either can be disconnected at pleasure, these features being represented in figs. 1 and 2.

In order to throw the pinion L in or out of gear with the wheel K, the rear end of the shaft I is mounted in a swinging box, pivoted at e', fig. 2, and which has connected to it a lever, m, which extends inward toward the driver's seat, and has its inner end connected by a cord, O, to one of the arms, or levers C, so that when the latter is raised, the end of the lever m is raised also, thus drawing the pinion L inward, away from the wheel K, the lever m also passing through an upright slotted guide-bar, n, shown in fig. 2.

The levers C, which serve to elevate the harrow, and disconnect the gearing, are connected at the front by a cross-bar E, as in the patent heretofore alluded to, and to this cross-bar there is pivoted a curved bar, or rod, D, as shown in fig. 1, this bar passing down through a hole in the frame, and having a series of notches cut on its front edge, so that, as it is raised, the notches will catch upon a plate, a', and thus hold up the levers C and their attachments, until released by the driver.

The hoppers G and H are made of a single box, with a partition, a, hinged at the bottom, at e, fig. 1, and which is held up by buttons, f, this division a extending lengthwise the whole length of the hoppers.

This division-board a is kept up when both hoppers are to be used, but when only grain is to be sown, then the partition a may be turned back, as shown in red, and, while covering the rear slide, thus increase the size of the hopper G.

The front hopper, which is intended for grass-seed, is much smaller, and has a series of openings in its bottom, over which is placed a metal slide, R, shown detached in fig. 7.

This slide has a series of small holes, v, arranged in clusters of V-shape directly over the openings in the hopper-bottom; and it has, projecting from one edge, a couple of arms, u, which rest upon projections, W, as shown in fig. 6.

In these arms u is a series of holes, through which a pin, b', is inserted, to hold the slide R in any required position. By shoving the slide in or out, more or less of the holes v may be thrown over the openings in the hopper-bottom, and thus the amount of seed sown may be regulated at pleasure.

A reciprocating bar, d, is arranged to slide to and fro over the slide R, for the purpose of stirring up the grass-seed, and feeding it through the holes in the slide.

The grain-slide h, shown enlarged in fig. 4, and in section in fig. 5, consists of an iron bar, having its upper and lower faces parallel, with its edges inclined and parallel, as shown in fig. 5.

In each of the acute-angled edges of this bar h, there is formed a series of semicircular grooves, or cups, t and t', as shown in figs. 4 and 5, their bottoms being inclined, as shown.

These grooves are made in pairs, with a division, x, between them, the upper face of this division-piece x being depressed below the surface of the bar, as represented in fig. 5, so as to prevent it from crushing the grain as it plays to and fro under the plates P.

This slide H is secured under the bottom of the hopper G by means of plates, Q, of corresponding form, as shown in figs. 3 and 4, these plates being of such a width as to cover and close both of the cells, when the slide is at the centre of its movement.

A plate, P, having an opening in its upper face, corresponding with the openings in the hopper-bottom, is placed over the slide, and over the plate Q, at each point where the cells, or grooves t' are formed, there being a recess in the top of this plate P for a slide to rest in, to vary the size of the opening, and thus regulate the flow of the seed, or grain.

The grooves, or cells in one edge of the slide h, are made larger than those in the opposite side, as shown in fig. 5, the smaller ones, t, being intended for sowing wheat and similar grains, while the larger ones, t', are intended for sowing oats, &c.

The slide g is made in the same manner, except that it has the cells formed in one edge only, and has a pin, $i$, projecting from its upper face, and extending up through the plate P into the hopper H, for stirring the fertilizer, and prevent it from becoming clogged, there being a slot formed in the rear part of the plate P for the pin, or stirrer $i$ to play to and fro in, as shown in fig. 3.

The manner in which these slides operate to distribute the seed is this:

As they are moved, and the cells come under the openings in the plates P, the cells are filled with seed, and as the slide moves on, one of the cells passes from under the plate P, and past the edge of plate Q, when the seed flows out of the cell upon the ground, the other cell being under the opening, and being filled at the same time; and, as the slide moves in the opposite direction, the latter cell passes out past the plate Q, on the opposite side, and is emptied while the first one is being filled, and so on alternately.

By adjusting the crank $r$ on the end of shaft I, the throw, or movement of the slides may be increased or decreased at will, and by means of the screw-thread on the end of the pitman-rod $k$, where it enters the sleeve $z$, the slides may be adjusted laterally, as required, to bring the cells to the exact position required.

By these improvements, I am enabled to produce a very superior machine, adapted to all the varying wants of the farmer, so far as sowing the various kinds of grains, grass-seeds, and fertilizers, is concerned.

Having thus described my invention,

What I claim, is—

1. The seed-slide $h$, having the cells, or grooves formed in its edges, in the manner substantially as described.

2. The slide $g$, with the cells, or grooves, and the stirrers $i$, constructed as herein set forth.

3. The slide R, provided with the arms $u$ for adjusting the position of the same, and having a series of perforations arranged in a cluster of V-form, for regulating the quantity of seed used, as herein described.

4. The curved rod D, constructed and arranged in connection with the levers C, for the purpose of automatically engaging with the frame, and supporting the levers, as the latter are raised by the operator.

5. The hinged partition $a$, arranged between the hoppers G and H, as shown and described.

6. The lever $m$, pivoted to the frame, and having the rear bearing of the shaft I mounted thereon, so as to swing with said lever, as and for the purpose described.

HENRY BEAN.

Witnesses:
H. B. MUNN,
W. C. DODGE.